United States Patent
Wild et al.

[19]

[11] Patent Number: 6,062,257
[45] Date of Patent: May 16, 2000

[54] FLOW CONTROL VALVE WITH INTEGRATED PRESSURE CONTROLLER

[75] Inventors: Willi Wild, Allenwinden; Siefried Merz, Rifferswil, both of Switzerland

[73] Assignee: Electrowatt Technology Innovation AG, Zug, Switzerland

[21] Appl. No.: 09/172,992

[22] Filed: Oct. 14, 1998

[30] Foreign Application Priority Data

Oct. 20, 1997 [EP] European Pat. Off. ............. 97118122

[51] Int. Cl.$^7$ ........................................................ G05D 7/01
[52] U.S. Cl. ................................................................ 137/501
[58] Field of Search ............................................... 137/501

[56] References Cited

U.S. PATENT DOCUMENTS

| | | | |
|---|---|---|---|
| 3,344,805 | 10/1967 | Wapner | 137/486 |
| 4,250,915 | 2/1981 | Rikuta | 137/501 |

FOREIGN PATENT DOCUMENTS

| | | |
|---|---|---|
| 0 264 466 A1 | 4/1988 | European Pat. Off. . |
| 0 347 675 A2 | 12/1989 | European Pat. Off. . |
| 0677708 | 3/1995 | European Pat. Off. . |
| 0 751 448 A2 | 1/1997 | European Pat. Off. . |
| 2 740 544 A1 | 4/1997 | France . |
| 2 039 344 | 8/1980 | United Kingdom . |

OTHER PUBLICATIONS

"Hydraulischer Abgleich—ein Dauerbrenner", *HeizungKlima*, No. 8–97, p. 18 (1997).

*Primary Examiner*—Stephen M. Hepperle
*Attorney, Agent, or Firm*—Proskauer Rose LLP

[57] ABSTRACT

A flow control valve has two successively arranged throttle locations. The first throttle location serves as an adjusting member for the through-flow. The second throttle location controls the pressure difference across the first throttle location to a constant value. The first throttle location is formed by a control member (4) which co-operates with a first valve seat (5) of a valve insert (7) which is fixedly connected to the valve housing (6). The second throttle location is formed by a pressure regulating member (9) which co-operates with a second valve seat (10) of the valve insert (7). The control member (4) and the pressure regulating member (9) are displaceable in an identical direction (12) and connected by means of a resilient diaphragm (13). The inlet chamber (1) is communicated with a pressure chamber (15) which acts on the diaphragm (13) and on the pressure regulating member (9). The operative surface which transmits the pressure ($p_1$) obtaining in the inlet chamber (1) to the pressure regulating member (9) is approximately equal to the operative surface which transmits the pressure ($p_2$) obtaining between the two throttle locations to the pressure regulating member (9). In that arrangement the flow medium flows rotationally symmetrically through the second throttle location.

23 Claims, 5 Drawing Sheets

Fig. 6
Fig. 5
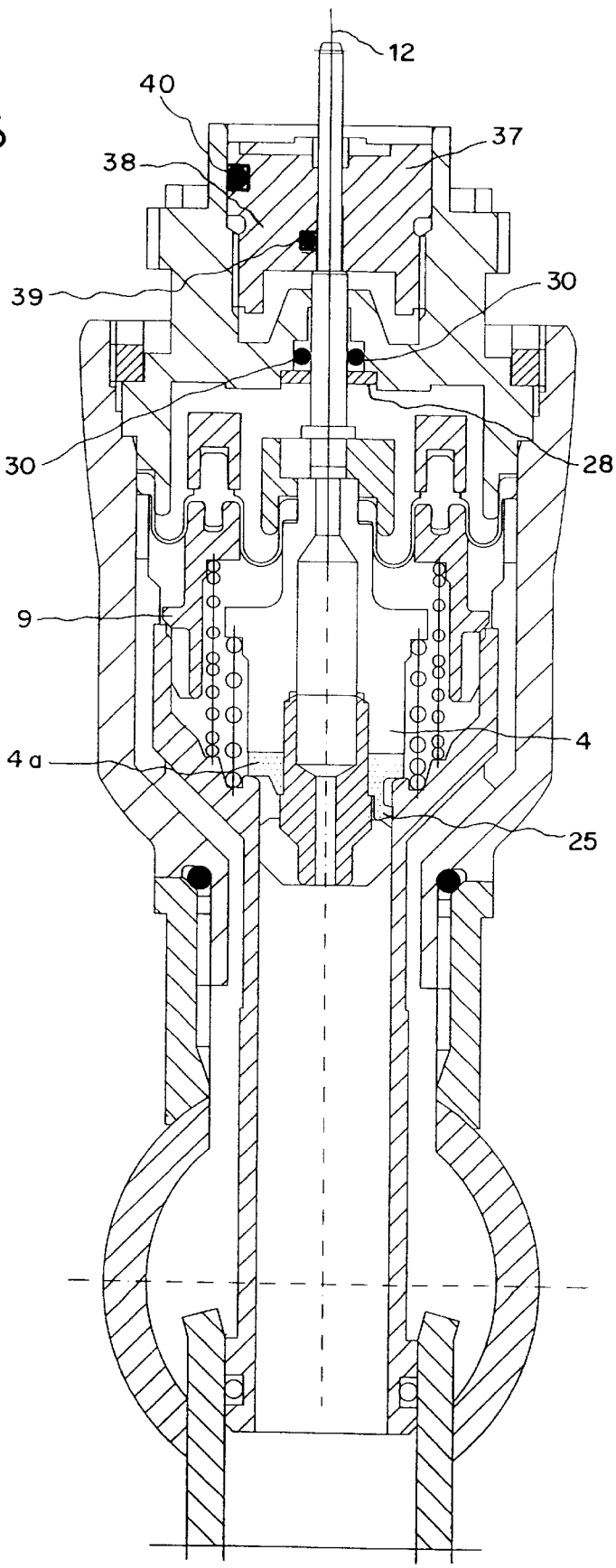
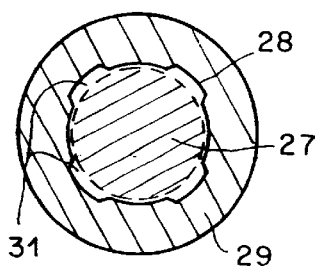

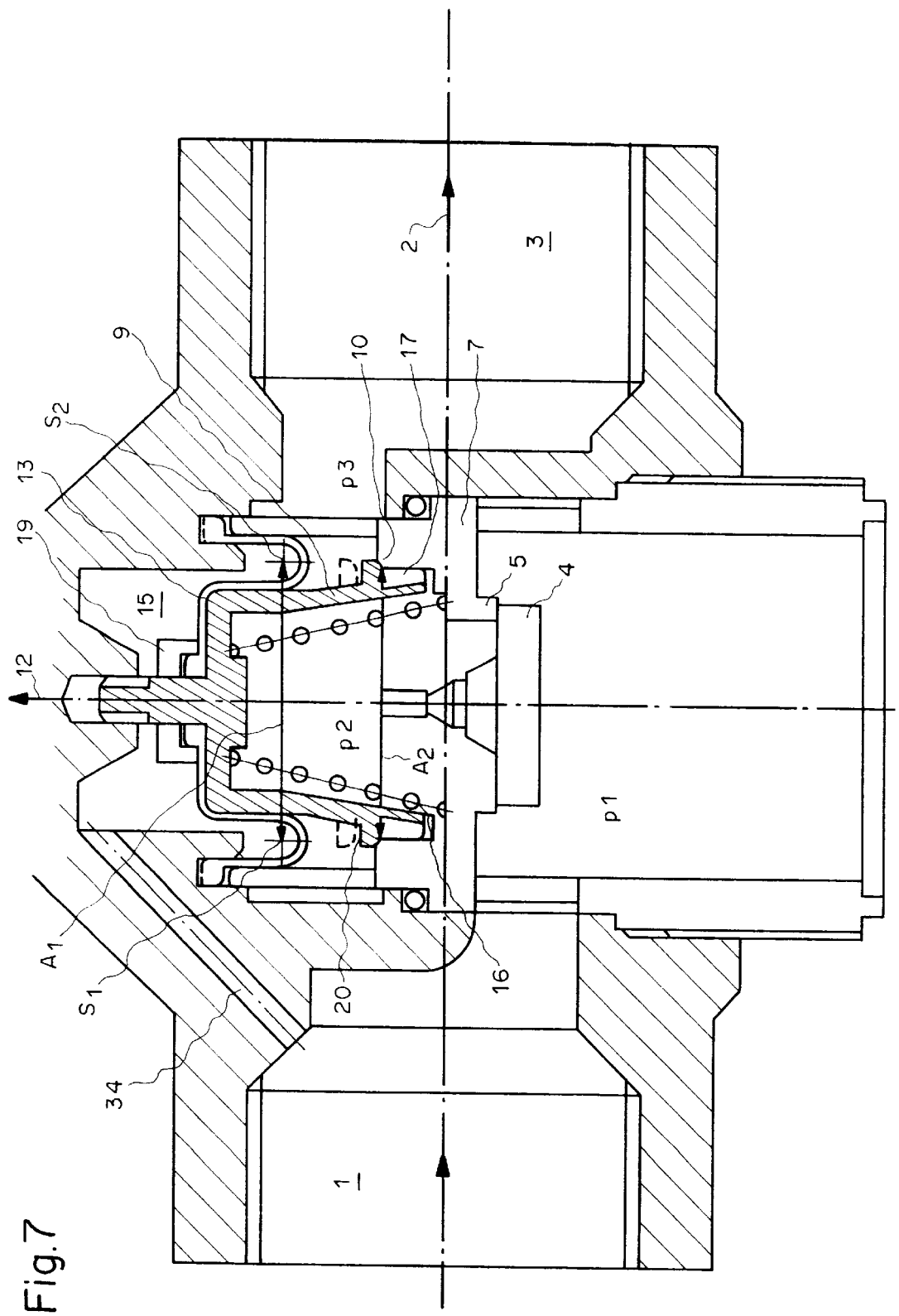

6,062,257

FLOW CONTROL VALVE WITH INTEGRATED PRESSURE CONTROLLER

The invention concerns a flow control valve with integrated pressure controller of the kind set forth in the classifying portion of claim 1.

In accordance with the teaching of European patent EP 677 708 such flow control valves are suitable for example for use as heating body valves in a hot water heating system in which a plurality of heating bodies are hydraulically connected together in at least one line. With such flow control valves, the individual heating bodies can be operated with a level of heating output which remains the same, independently of the respectively prevailing pressure drop which is influenced by the operation of the other heating bodies. That is achieved in known manner by a control member which controls the through-flow of a flow medium and a pressure regulating member which regulates the pressure drop at the control member.

A flow control valve of the kind set forth in the classifying portion of claim 1 is known from U.S. Pat. No. 3,344,805. The flow control valve which is designed for industrial installations suffers from the disadvantage that the pressures which act on the pressure regulating member are asymmetrical as the flow medium which flows through the valve is discharged in an irregular fashion, that is to say at one side, and in addition, with an increasing degree of opening of the pressure regulating member, the pressure drop at the control member can no longer be satisfactorily regulated by varying, that is to say changing, surface areas by way of which the corresponding prevailing pressures apply forces to the control member and the pressure regulating member. In addition the seal in the form of an O-ring which is disposed between the drive bar of the control member and the pressure regulating member involves relatively high frictional forces whereby this valve is not suitable as a thermostatic valve.

A further flow control valve is known from European patent application EP 751 448. That relatively large valve is also not suitable for use as a heating body valve.

French patent application FR 2 740 544 discloses a valve having a single throttle location wherein the quantitative through-flow rate is approximately independent of the pressure drop. This unit however does not have an adjusting means for adjusting the rated through-flow, that is to say a control member.

The invention is based on the problem of improving a flow control valve of the specified kind in such a way that the dimensions are more compact, that the pressure regulating member of the control valve is movable as easily as possible in order to reduce the level of pressure hysteresis, and that the valve is suitable for use as a heating body valve.

The invention solves that problem by virtue of the features of claim 1. Further advantageous configurations are set forth in the appendant claims.

The invention discloses a flow control valve for controlling the through-flow of a flow medium, comprising an inlet chamber, two successively arranged throttle locations and an outlet chamber, wherein the first throttle location serves as an adjusting member for the through-flow and wherein the pressure difference across the first throttle location is controlled to a constant value by means of the second throttle location. In that arrangement the first throttle location is formed in known manner by a control member which co-operates with a first valve seat for controlling the through-flow while the second throttle location is formed by a pressure regulating member which co-operates with a second valve seat for controlling the pressure difference.

The inlet chamber is communicated with a pressure chamber which at least partially acts on the pressure regulating member insofar as the flow medium can circulate freely between the inlet chamber and the pressure chamber, that is to say in particular the same pressure obtains in the pressure chamber as in the inlet chamber. In that respect, a first operative surface which transmits the pressure obtaining in the inlet chamber to the pressure regulating member is approximately equal to a second operative surface which transmits the pressure obtaining between the two throttle locations to the pressure regulating member, and the pressure regulating member, by virtue of a rotationally symmetrical structure and by virtue of the rotationally symmetrical configuration of the outlet chamber downstream of the second throttle location, permits a rotationally symmetrical through-flow of the flow medium.

The pressure regulating member and the valve housing are connected by means of a resilient diaphragm, wherein the diaphragm is also connected to the control member when the pressure regulating member is arranged on the drive side of the control member. Then in that way the control member and the pressure regulating member are connected by means of the resilient diaphragm which is displaceable in an identical first direction. The resilient diaphragm serves for movably mounting the pressure regulating member and for sealing off the pressure chamber. The pressure regulating member can move freely by means of being suspended by the diaphragm, between the valve housing and the control member which is displaceable by the drive but otherwise fixed. In that respect the diaphragm is fixed to the control member or the drive bar or spindle for driving the control member, in such a way that it seals off the pressure chamber with respect to the space or chamber between the throttle locations. That eliminates any O-ring seals and the arrangement guarantees that the control member is displaced with a very easy motion and that the pressure regulating member is also moved almost without friction relative to the control member. Furthermore the diaphragm guarantees reliable sealing integrity which is independent of the movements of the individual members, to prevent a pressure drop in the individual chambers of the valve. When the pressure regulating member is arranged on the side remote from the drive for the control member, the pressure regulating member is directly connected to the valve housing by means of the diaphragm.

The pressure regulating member and the control member are advantageously of a conical or at least partially conical shape in order to ensure a configuration which is as advantageous as possible in terms of flow dynamics for the flow medium.

The pressure regulating member, the control member and the corresponding connections, also by way of the diaphragm, are of such a nature, and in particular the corresponding valve seats in relation to the members, that a third operative surface which transmits the pressure obtaining in the inlet chamber to the control member in the first direction is approximately equal to a fourth operative surface which transmits the pressure obtaining in the inlet chamber to the control member in the direction opposite to the first direction. In that situation, the third operative surface is disposed on the side of the control member, which is towards the inlet chamber, and the fourth operative surface is disposed on the side of the control member, which is towards the pressure chamber. The sum of the first operative surface and the fourth operative surface is approximately the same as the sum of the second operative surface and the third operative surface, wherein the operative surfaces arise out of such "engagement surfaces" which permit exertion or transmission of force, caused by the corresponding pressures, in the first direction, identified in the Figures as the y-direction.

The pressure regulating member is of such a configuration that the force which, due to the pressure obtaining in the outlet chamber, at least partially acts on the pressure regulating member in the first direction, corresponds to the force or forces which, due to the pressure obtaining in the outlet chamber, at least partially act on the pressure regulating member in a direction opposite to the first direction (12).

The forces caused by the pressure obtaining in the outlet chamber, and the forces caused by the pressure obtaining in the inlet chamber and in the pressure chamber and the pressure obtaining between the throttle locations and/or the forces caused by the flow of the flow medium at least through the second throttle location, respectively, act symmetrically on the corresponding movable members within the valve, due to the shaping and the above-mentioned configuration of the pressure regulating member, the diaphragm, the control member and the pivotal connections or guide means and the throttle locations. By virtue of the forces acting in a symmetrical relationship the valve can be designed with the approximately equal-sized operative surfaces, as a small unit, for use as heating body valves.

In the region around the second throttle location, by means of vanes or ribs which are arranged approximately in parallel relationship with the first direction and which serve to provide for low-friction guidance of the pressure regulating member, the pressure regulating member forms at the same time flow chambers which prevent a flow of the flow medium in directions which are not approximately parallel to the first direction. In addition there are means for increasing the mass of the pressure regulating member which, together with the flow chambers, prevent flutter or resonance oscillations of the pressure regulating member, by virtue of its free mobility and the medium flowing through the arrangement.

The second throttle location is formed by a conical surface which co-operates with a sharp-edged counterpart portion, so that, as a result of the very small surface areas, the forces produced by the flow in accordance with Bernoulli's law on the pressure regulating member (9) remain as low as possible. Furthermore the control member advantageously has a rubber portion which forms the first throttle location with the first valve seat, the rubber portion having a sealing lip which sectorially delimits the through-flow of the flow medium through the first throttle location.

Advantageously, the control member has a chamber whose volume is at least half as great as the variation in volume produced in the pressure chamber by a full stroke change, in order to facilitate any stroke movements that may occur due to the exchange of the flow medium, without deposits passing out of the circuit into the pressure chamber.

Advantageously, the valve housing together with all parts related to the functioning of the flow control valve is releasably connected to the pipe or housing forming the inlet chamber and the outlet chamber, so that the valve can be fitted for example only after installation of the heating pipes.

Embodiments of the invention are described in greater detail hereinafter with reference to the drawings in which:

FIG. 5 is a view in cross-section of a bore for mounting a spindle.

FIG. 6 is a sectional view of the flow control valve which is suitable for easy installation in a radiator piping arrangement, and FIG. 7 is a sectional view of another embodiment of the flow control valve with two throttle locations.

Figure 1:
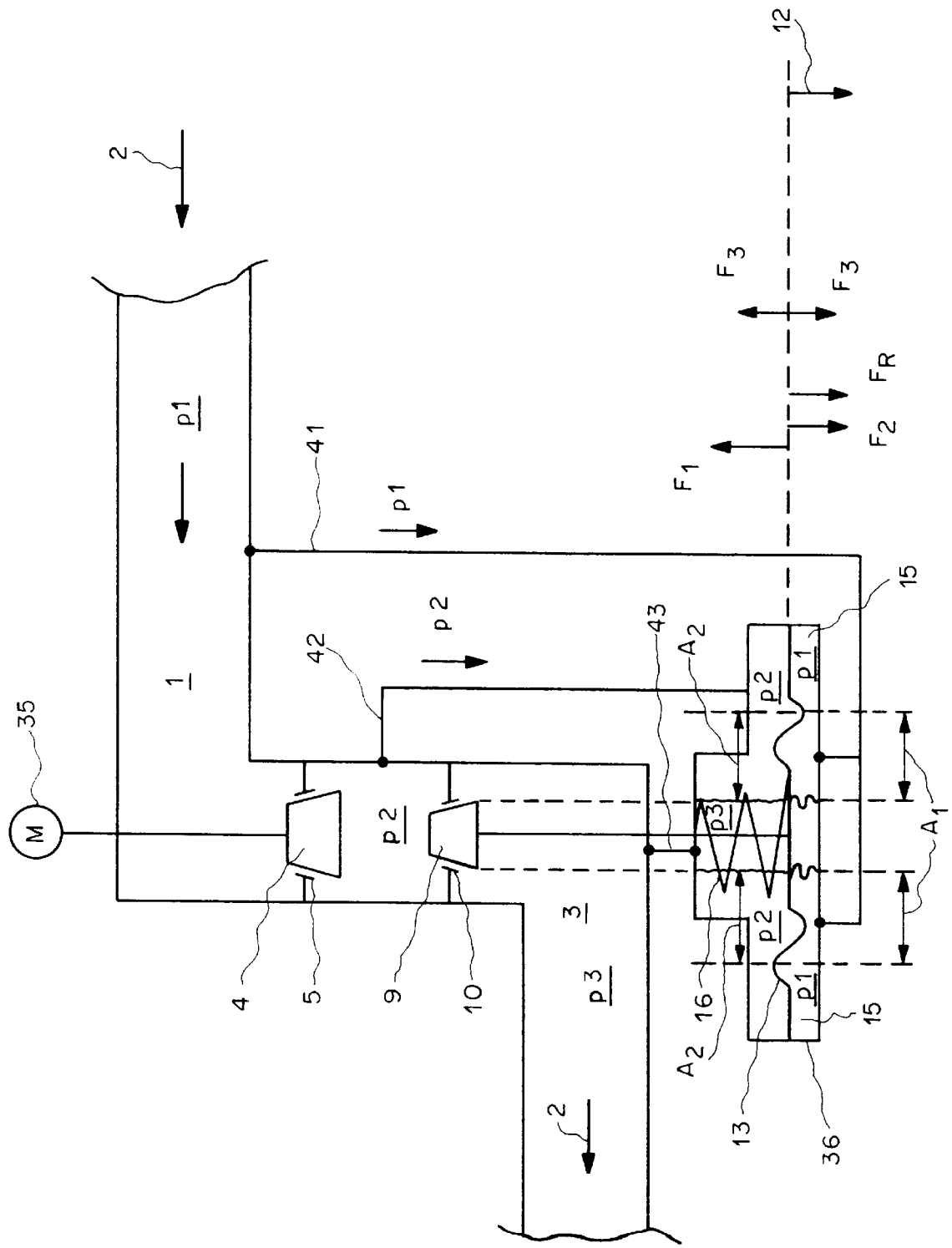
FIG. 1 is a view showing the principle of the invention.
Figure 2:
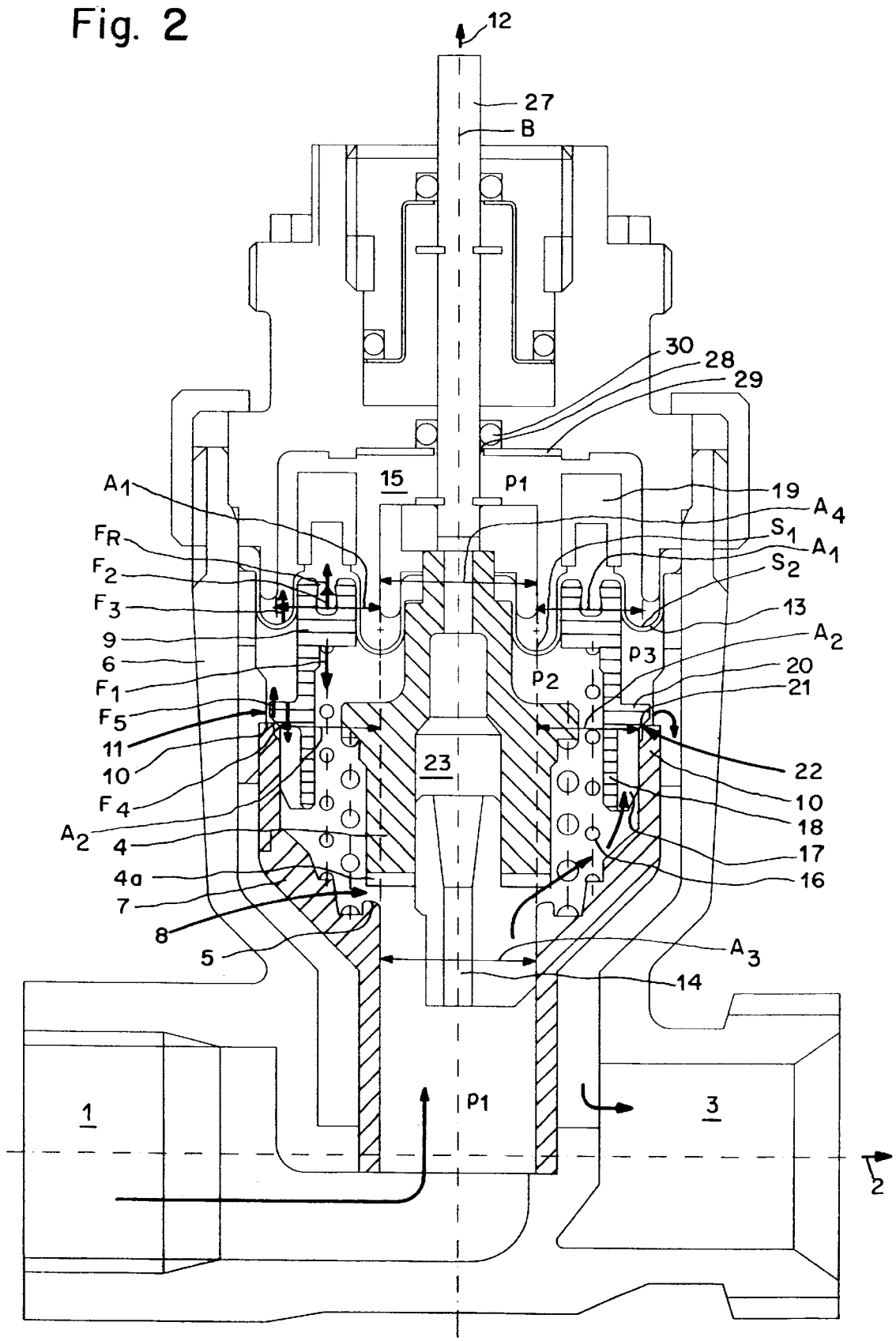
FIG. 2 is a sectional view of a flow control valve with two throttle locations.

FIG. 1 shows the principle of the invention and serves for easier explanation of the valve shown in FIG. 2. The reference numerals used correspond to each other. FIG. 1 showing additional lines or conduits 41, 42 and 43 which pass the corresponding pressures in the individual chambers to the "pressure control vessel" or the diaphragm drive 36 shown in the lower part of FIG. 1. Also to be noted are the forces shown at the right-hand edge in FIG. 1, in the first direction 12. In that respect a motor 35 drives the control cone 4.

FIG. 2 shows a flow control valve operating on the basis of the principle illustrated in FIG. 1, through the inlet chamber 1 of which the flow medium which flows in the x-direction 2 passes into the flow control valve and through the outlet chamber 3 of which the flow medium again leaves the flow control valve in the same x-direction 2, as is also illustrated by arrows. Two series-connected throttle locations are disposed between the inlet chamber 1 and the outlet chamber 3. The first throttle location is formed by a control member 4 co-operating with a first valve seat 5, wherein the valve seat 5 can be for example a valve insert 7 which is fixedly connected to the valve housing 6, to form a first adjustable opening 8. The control member 4 has a sealing element 4a so that the opening 8 is sealingly closed in the closed condition of the flow control valve. The second throttle location is formed by a pressure regulating member 9 co-operating with a second valve seat 10, for example of the valve insert 7, for forming a second adjustable opening 11. The pressure in the inlet chamber is denoted by $p_1$ the pressure between the two throttle locations is denoted by $p_2$ and the pressure in the outlet chamber is denoted by $p_3$. Those pressures are passed through the lines or conduits 41, 42, 43 shown in FIG. 1 to the diaphragm drive 36 which is described in greater detail hereinafter.

The first throttle location serves as an adjusting member for the through-flow, while the function of the second throttle location is that of keeping constant the pressure difference $p_1-p_2$ across the first throttle location, so that the through-flow is independent of the pressure difference $p_1-p_3$ which obtains across the flow control valve. The flow medium flows through the flow control valve in the x-direction 2. The control member 4 and the pressure regulating member 9 are displaceable along a y-direction 12 which is directed perpendicularly to the x-direction 2. The y-position of the control member 4 determines the degree of opening of the first opening 8 and thus the through-flow. The control member 4 is actuated by a reference value setting device, for example a remotely controlled electric-motor drive 35 or a thermostatic drive.

The pressure regulating member 9 is connected by way of a resilient diaphragm 13 both to the control member 4 and also to the valve housing 6. The diaphragm 13 is part of a hydraulic drive which controls the position of the pressure regulating member 9 with respect to the second valve seat 10, and thus the degree of opening of the second opening 11, That control action is allowed by virtue of the fact that on the one hand the input pressure $p_1$ and on the other hand the pressure $p_2$ acting between the throttle locations act on the diaphragm 13. In order to produce that effect, the inlet chamber 1 is connected by way of a bore 14 in the control member 4 to a pressure chamber 15 which acts on the diaphragm 13 and on the pressure regulating member 9. The pressure $p_1$ thus exerts on the pressure regulating member 9 a force $F_1$ acting in the negative y-direction 12. On the other hand the pressure $p_2$ exerts on the pressure regulating member 9 a force $F_2$ acting in the positive y-direction 12. The operative surface at which the pressure $p_1$ acts on the diaphragm 13 or on the pressure regulating member 9 is of the same size as the effective surface at which the pressure $p_2$ acts on the diaphragm 13 or on the pressure regulating member 9. The resultant force $F_{1-F2}$ is therefore directly proportional to the differential pressure $p_1-p_2$. A control spring 16 which is stressed between the valve insert 7 and the pressure regulating member 9 exerts a force $F_R$ acting in the positive y-direction 12 on the pressure regulating member 9. The degree of opening of the opening 11 is so set that the forces $F_1-F_2$ and $F_R$ are of the same magnitude.

The control spring 16 could also be operatively disposed between the pressure regulating member 9 and the control member 4, although that would involve tolerating a slight impairment in terms of the valve characteristics.

The operative surface $A_1$ at which the pressure $p_1$ acts on the diaphragm 13 or on the pressure regulating member 9 extends in a radial direction substantially between the two apex points $S_1$ and $S_2$ of the diaphragm 13 in rotationally symmetrical relationship centred around the centre line B of the valve member in the y-direction 12. The operative surface $A_2$ at which the pressure $p_2$ acts on the diaphragm 13 or on the pressure regulating member 9 extends in the radial direction substantially from the apex point $S_1$ of the diaphragm 13 to the second valve seat 10. The valve seat 10 and the apex point $S_2$ are therefore approximately on a line which is parallel to the y-direction 12. It is to be noted here that the spacing of the apex points $S_1$ and $S_2$ relative to the y-line 12 is slightly dependent on the position of the control member 4 and the position of the pressure regulating member 9.

In addition the control member 4 is of such a configuration that the operative surface $A_4$ which is exposed in the upper region of the control member 4 to the pressure $p_1$ of the pressure chamber 15 and which extends substantially radially between the centre line B and the apex point $S_1$ approximately corresponds to the operative surface $A_3$ which results from the diameter of the first throttle location or the spacing of the centre line B relative to the first valve seat 5. That therefore ensures a force equilibrium which extends both over the control member 4 so that the force necessary to move the control member is minimal and also over the pressure regulating member 9 so as to afford the desired pressure stability for the through-flow of the first throttle location independently of the pressure $p_3$ of the outlet chamber.

The rotationally symmetrical structure of the entire flow control valve means that the water flows through the second throttle location over the entire angular range of 360° so that consequently the stroke movement of the pressure regulating member 9, that is required for the control action, is minimal. A change in the position of the pressure regulating member 9 as a result of a change in the outer pressure difference $p_1-p_3$ thus results in the smallest possible change in stroke and thus the smallest possible change in the force $F_R$ applied to the pressure regulating member 9 by the control spring 16 and thus the smallest possible change in the operative pressure $p_1-p_2$ determining the through-flow.

The resilient diaphragm 13 permits practically friction-free movement both of the control member 4 and also of the pressure regulating member 9 along the y-direction 12.

Guidance for the pressure regulating member 9 in the y-direction is ensured by vanes or ribs 17 co-operating with the valve insert 7 or the valve member 6 itself. The pressure regulating member 9 preferably has a cylindrical casing portion 18 which is formed parallel to the y-direction 12 and which connects the vanes 17 so that small flow chambers are formed between the vanes 17. Now, any movement of the pressure regulating member 9 in the x-direction 2 means that some of the flow chambers become smaller and others become larger. The redistribution of the flow medium, which is required in that situation, is however made more difficult as the flow chambers make it very much more difficult for the flow medium to flow in the x-direction 2. Oscillations of the pressure regulating member 9 are in that way heavily damped if not entirely prevented.

The mass of the pressure regulating member 9 can be increased by means of a ring 19 which is fitted onto the pressure regulating member 9, for example consisting of brass, copper or sealed lead, and in that way the resonance frequency of the possible oscillations can be lowered. As a result the resonance frequency is lower than the excitation frequencies caused by the flow.

The pressure $p_3$ also acts on the diaphragm 13 and exerts a force $F_3$ acting in the positive y-direction 12 on the pressure regulating member 9. To compensate for that force $F_3$ the pressure regulating member 9 has an extension portion 20 which is acted upon by the pressure $p_3$ in such a way that a force $F_4$ directed in the negative y-direction 12 also acts on the pressure regulating member 9. It is to be noted here that the pressure $p_3$ also acts on the extension portion 20 in the region of the second valve seat 10 and exerts a force $F_5$ which also acts in the positive y-direction 12 on the pressure regulating member 9. The operative surface area of that extension portion 20 is equal in size to the operative surface at which the pressure $p_3$ acts on the diaphragm 13 so that the forces $F_3$, $F_4$ and $F_5$ compensate for each other. The pressure $p_3$ in the outlet chamber 3 then has no influence on the position of the pressure regulating member 9.

In the region of the second valve seat 10 the pressure regulating member 9 has a conical surface 21 which in the cross-sectional view appears as an inclined edge. The second valve seat 10 is of a sharp-edged configuration, wherein the edge 22 touches the conical surface 21 of the pressure regulating member 9 along a circular line when the second throttle location is closed. The cross-sectional area which is operative for the through-flow is at the lowest in the immediate region of the opening 11 and therefore the flow rate of the flow medium is at its highest there. Therefore, the pressure is reduced there, in accordance with Bernoulli's law. The result of this is that in the immediate proximity of the opening 11 it is not the pressure $p_2$ or $p_3$ that acts on the pressure regulating member 9, but a pressure which is reduced with respect to the pressure $p_2$ or $p_3$ respectively. That results in a reduction in the force $F_2$ which acts overall on the pressure regulating member 9. The reduction in the force $F_2$ can be partially compensated by way of a corresponding increase in the area of the surface at which the pressure $p_2$ acts on the pressure regulating member 9.

As now however the reduction in the force $F_2$ within the working range of the flow control valve is not constant but depends on the degree of opening of the opening 11, there still remains a slight dependency in respect of the through-flow, on the pressure difference $p_1-p_3$ obtaining across the flow control valve. If however the valve seat 10 were not of a sharp-edged configuration as described, but were provided with a surface which is disposed parallel to the conical surface 21, then the range where it is no longer the pressure $p_2$ but a lower pressure that acts on the pressure regulating member 9 would be even larger. That means that the dependency of the through-flow on the pressure difference $p_1-p_3$ obtaining across the flow control valve would also be more pronounced.

The reduction, caused as a result of the flow, in the pressure $p_3$ acting on the extension portion 20 is expressed in a reduction in the magnitude of the force $F_5$. The reduction in the force $F_5$ is dependent on the flow speed and thus the through-flow. In order to minimise that effect the extension portion 20 extends in the radial direction as little as possible beyond the valve seat 10 defined by the inner edge, that is to say only as far as is necessary as a result of inevitable tolerances.

Provided within the control member 4 is a chamber 23 whose volume in the ideal situation is at least as large and advantageously at least half as large as the variation in volume of the pressure chamber 15, which is caused by a full stroke variation. In the event of a stroke movement of the control member 4 or the pressure regulating member 9, the volume of the pressure chamber 15 varies, as a result of which there would have to be an exchange of flow medium between the pressure chamber 15 and the inlet chamber 5. The chamber 23 can entirely or at least partially accommodate that more or less amount of flow medium so that exchange between the pressure chamber 15 and the inlet chamber 1 occurs only in the event of large stroke variations in respect of the control member 4. The risk of contamination of the pressure chamber 15 or the bore between the chamber 23 and the pressure chamber 15 is thus reduced.

Figure 3:
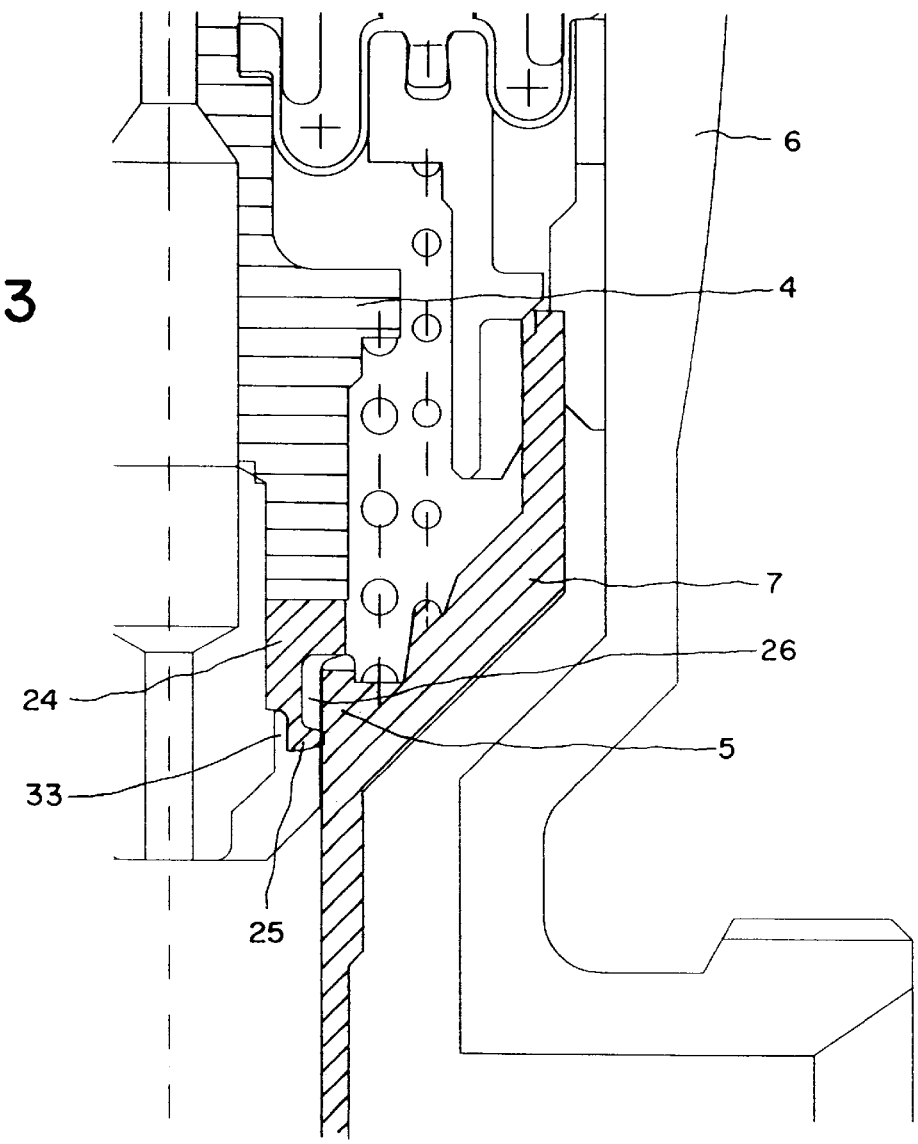
FIG. 3 shows a particular configuration of the first throttle location.
Figure 4:
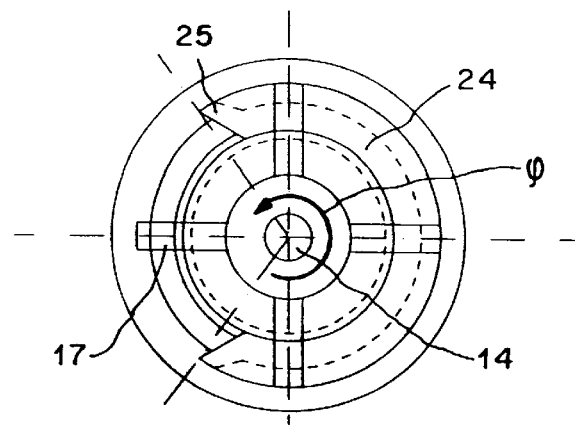
FIG. 4 is a view in cross-section of a part of the first throttle location.

FIG. 3 shows the second throttle location on a larger scale than FIG. 1 or FIG. 2, so that the details in regard to configuration are more clearly visible here, FIG. 3 now further shows an embodiment of the first throttle location in which a rubber portion 24 is fitted onto the control member 4 and co-operates with the first valve seat 5. The rubber portion 24 has a sealing lip 25 which bears laterally against the first valve seat 5 and thus ensures sealing integrity. As is shown in FIG. 4, the sealing lip 25 embraces any angle $\phi$ which can be for example 120° or 270° and therefore limits the flow through the first throttle location sectorially. The opening cross-section of the first throttle location depends on the stroke of the control member 4 and the periphery of the gap opening which is formed in that case. The periphery of the gap opening and thus the quantitative through-flow are reduced as a function of the stroke, with the sealing lip 25. An advantage with this construction is that the range in which the quantitative through-flow is controllable is enlarged downwardly and that the risk of blockage due to dust and dirt particles is reduced. The sealing lip 25 is narrow and at its two ends has an undercut configuration. In the event of possible swelling of the rubber portion 24, that is intended to ensure that the throttle location remains fully operational: the force which acts upon a variation in the stroke of the control member 4 is either sufficient for the sealing lip 25 also to perform the variation in stroke without any problem or for just the control member 4 to implement the variation in stroke, in which case it will be appreciated that the sealing lip 25 clinging to the valve seat 5 is then deformed. Provided above the sealing lip 25 is a relatively large cavity 26 (FIG. 3) so that any deposits of dirt or lime cannot cause the rubber portion 24 to become stuck.

To minimise the friction between the sealing lip 25 and the first valve seat 5, a further cavity 33 is preferably also provided behind the sealing lip 25, the cavity 33 permitting the sealing lip 25 to yield in a radial direction.

The rubber portion 24 comprises water-resistant rubber. Therefore, in the event of oil contamination of the medium flowing through the flow control valve, it can happen that the rubber portion 24 swells up. The described structure ensures that the flow control valve nonetheless operates reliably.

The control member 4 is connected to a spindle 27 which is actuable manually or by a drive (not shown) for adjusting the opening 8. The spindle 27 is passed through a bore 28 in a mounting portion 29 which serves to guide and support the spindle 27. An O-ring 30 serves to seal off the pressure chamber 15 relative to the exterior. FIG. 5 shows the bore 28 in cross-section. The bore 28 is not round but has recesses 31 which are directed radially outwardly from the round shape so that between the spindle 27 and the mounting portion 29 there remain a plurality of gaps through which the medium, generally heating water, can freely circulate at any time between two sides of the mounting portion 29. That prevents solid constituents from crystallising out in the bore 28 and thus prevents the spindle 27 from jamming. The bore 28 is nonetheless of such a configuration that satisfactory guidance of the spindle 27 is guaranteed, as in the case of a round bore. So that the control member 4 (FIG. 1) can follow a movement of the spindle 27 in the positive y-direction 12 without delay, operatively disposed in known manner between the control member 4 and the valve housing 6 is a second spring which exerts on the control member 4 a force which acts in the positive y-direction 12.

FIG. 6 shows an embodiment of the flow control valve which is suitable for simple installation in a radiator piping arrangement 32. In the case of this valve the feed and discharge of the heating water occur coaxially along the direction 12 in which the control member 4 and the pressure regulating member 9 are displaceable. The Figure shows this modification in two different variations. Mounted on the control member 4 is a sealing element 4a which serves for reliably sealing off the control valve and which can optionally be provided with the sealing lip 25 for sectorial through-flow regulation of the flow medium. The upper region of the spindle 27 is passed through a gland 37 and through the bore 28 illustrated in FIG. 5, which provides for guiding and supporting the spindle 27. In the event of failure of the O-ring 30 or in the event of a leak occurring, the gland 37 can be replaced by a service gland 38 which ensures sealing integrity of the control valve by means of two further O-rings 39 and 40. That makes it unnecessary to remove and dismantle the control valve to replace the defective O-ring 30.

FIG. 7 shows another embodiment of the flow control valve according to the invention, in which the drive (not shown) for the control member 4 is on the side of the control member 4, that is remote from the pressure regulating member 9. That results in the control valve being of a simpler design configuration as the drive, that is to say for example the spindle 27, no longer has to be passed through the pressure regulating member 9 and the pressure chamber 15 and thus the above-described sealing problems as between the pressure chamber 15 and the space between the throttle locations no longer occur.

Also shown here is an inlet chamber 1 through which the flow medium flowing in the x-direction 2 passes into the flow control valve and an outlet chamber 3 through which the flow medium leaves the flow control valve in the same x-direction 2 again. Also disposed between the inlet chamber 1 and the outlet chamber 3 are again the above-described two throttle locations which are connected in series. The first throttle location is formed by the control member 4 co-operating with a first valve seat 5. The second throttle location is formed by the pressure regulating member 9 co-operating with a second valve seat 10 of the valve insert 7. The pressure in the inlet chamber is identified by pi the pressure between the two throttle locations is identified by $p_2$ and the pressure in the outlet chamber is identified by $p_3$.

The pressure regulating member 9 is connected to the valve housing 6 by way of a resilient diaphragm 13. Control of the pressure acting between the throttle locations is in this case also made possible by virtue of the fact that on the one hand the input pressure $p_1$ and on the other hand the pressure $p_2$ acting between the throttle locations acts on the diaphragm 13. In order to achieve that effect, the inlet chamber 1 is communicated by way of a bore 34 in the valve housing with a pressure chamber 15 which acts on the diaphragm 13 and on the pressure regulating member 9. The pressure $p_1$ thus exerts on the pressure regulating member 9 a force $F_1$ acting in the negative y-direction 12. On the other hand the pressure $p_2$ exerts on the pressure regulating member 9 a force $F_2$ acting in the positive y-direction 12. The operative surface $A_1$ at which the pressure $p_1$ acts on the diaphragm 13 or on the pressure regulating member 9 is of equal size to the operative surface $A_2$ at which the pressure $p_2$ acts on the diaphragm 13 or on the pressure regulating member 9. The resulting force $F_1$–$F_2$ is therefore directly proportional to the differential pressure $p_1$–$p_2$. A control spring 16 operatively disposed between the valve insert 7 and the pressure regulating member 9 exerts a force $F_R$ acting on the pressure regulating member 9 in the positive y-direction 12. The degree of opening of the opening 11 is so set that the forces $F_1$–$F_2$ and $F_R$ are of the same magnitude, in principle therefore as described with reference to FIG. 1.

The operative surface $A_1$ at which the pressure $p_1$ acts on the diaphragm 13 or on the pressure regulating member 9 extends in a radial direction substantially between the two apex points $S_1$ and $S_2$.

The rotationally symmetrical structure of the entire flow control valve means that the water flows through the second throttle location over the entire angular range of 360° so that consequently the stroke of the pressure regulating member 9, which is necessary for the control action. becomes minimal. A variation in the position of the pressure regulating member 9 as a result of a variation in the outer pressure difference $p_1$–$p_3$ thus results in the smallest possible stroke variation and thus the smallest possible variation in the force $F_R$ applied to the pressure regulating member 9 by the control spring 16 and thus the smallest possible variation in the operative pressure $p_1$–$p_2$ which determines the through-flow.

Guidance for the pressure regulating member 9 in the y-direction is also ensured on the one hand by vanes or ribs 17 co-operating with the valve insert 7 and on the other hand by vanes or ribs or simply by a cylindrical extension portion at the other end of the pressure regulating member 9, which engages into a recess in the valve housing 9 and is supported there with as little friction as possible, with the flow medium flowing therearound.

The mass of the pressure regulating member 9 can be increased by means of a ring 19 which is fitted onto the pressure regulating member 9. consisting for example of brass, copper or sealed lead, and thus the resonance frequency of the possible oscillations can be reduced. As a result the resonance frequency is lower than the excitation frequencies produced by the flow.

The pressure $p_3$ also acts on the diaphragm 13 and applies a force $F_3$ acting on the pressure regulating member 9 in the positive y-direction 12. To compensate for that force $F_3$ the pressure regulating member 9 has an extension portion 20 at which the pressure $p_3$ compensates for that force, just as already described hereinbefore.

The embodiment shown in FIG. 7 is suitable in particular for heating systems in which a low structural depth is required. That is advantageous for example for heat exchangers. Here too a vertical feed of the flow medium is possible (as illustrated for the first control valve in FIG. 6) if the drive for the control member 4 is taken out laterally for example by means of an angle transmission or magnetic drives are used.

What is claimed is:

1. A flow control valve for controlling the through-flow of a flow medium, comprising an inlet chamber (1), two successively arranged throttle locations and an outlet chamber (3), wherein the first throttle location serves as an adjusting member for the through-flow and wherein the pressure difference ($p_1$–$p_2$) across the first throttle location is controllable to a constant value by means of the second throttle location, and the first throttle location is formed by a control member (4) which co-operates with a first valve seat (5), the second throttle location is formed by a pressure regulating member (9) which cooperates with a second valve seat (10), and the inlet chamber (1) is communicated with a pressure chamber (15) which at least partially acts on the pressure regulating member (9);

characterised in that a first operative surface ($A_1$) which transmits the pressure ($p_1$) obtaining in the inlet chamber (1) to the pressure regulating member (9) is approximately equal to a second operative surface ($A_2$) which transmits the pressure ($p_2$) obtaining between the two throttle locations to the pressure regulating member (9), the pressure regulating member (9) permits a rotationally symmetrical through-flow of the flow medium, and a third operative surface ($A_3$) which transmits the pressure ($p_1$) obtaining in the inlet chamber (1) to the control member (4) in the first direction (12) is approximately equal to a fourth operative surface ($A_4$) which transmits the pressure ($p_1$) obtaining in the inlet chamber (1) to the control member (4) in the direction opposite to the first direction (12).

2. A flow control valve according to claim 1 characterised in that the pressure regulating member (9) and the valve housing (6) are connected by means of a resilient diaphragm (13).

3. A flow control valve according to claim 1 characterised in that the third operative surface ($A_3$) is disposed on the side of the control member (4), that is towards the inlet chamber (1) and the fourth operative surface ($A_4$) is disposed on the side of the control member (4), that is towards the pressure chamber (15).

4. A flow control valve according to claim 1 characterised in that the sum of the first operative surface ($A_1$) and the fourth operative surface ($A_4$) is approximately of the same magnitude as the sum of the second operative surface ($A_2$) and the third operative surface ($A_3$).

5. A flow control valve according to claim 1 characterised in that the control member (4) and the pressure regulating member (9) are connected by means of a resilient diaphragm (13) and are displaceable in an identical first direction (12).

6. A flow control valve according to claim 1 characterised in that
the resilient diaphragm (13) serves for movably mounting the pressure regulating member (9) and for sealing the pressure chamber (15).

7. A flow control valve according to claim 1 characterised in that
the pressure regulating member (9) is of such a configuration that the force ($F_3$) which by virtue of the pressure ($p_3$) obtaining in the outlet chamber (3) at least partially acts on the pressure regulating member (9) in the first direction (12) corresponds to the force ($F_4$, $F_5$) which due to the pressure ($p_3$) obtaining in the outlet chamber (3) at least partially acts on the pressure regulating member (9) in a direction opposite to the first direction (12).

8. A flow control valve according to claim 1 characterised in that
the forces ($F_1$–$F_5$) caused by the pressure ($p_3$) obtaining in the outlet chamber (3), the pressure ($p_1$) obtaining in the inlet chamber (1) and in the pressure chamber (15) and the pressure ($p_2$) obtaining between the throttle locations and/or by the flow of the flow medium at least through the second throttle location symmetrically act on the pressure regulating member (9) and the control member (4).

9. A flow control valve according to claim 1 characterised in that
the pressure regulating member (9) forms in the region around the second throttle location by means of vanes (17) arranged approximately parallel to the first direction (12) flow chambers which prevent a flow of the flow medium in directions which are not approximately parallel to the first direction (12).

10. A flow control valve according to claim 1 characterised in that
there are means (19) for increasing the mass of the pressure regulating member (9).

11. A flow control valve according to claim 1 characterised in that
the second throttle location (9, 10) is formed by a conical surface co-operating with a sharp-edged counterpart portion so that the reduction, caused as a result of the flow in accordance with Bernoulli's law, in the pressure acting on the pressure regulating member (9), is as small as possible.

12. A flow control valve according to claim 1 characterised in that
the control member (4) has a rubber portion (24) which with the first valve seat (5) forms the first throttle location, wherein the rubber portion (24) has a sealing lip (25) which sectorially delimits the flow of the flow medium through the first throttle location.

13. A flow control valve according to claim 12 characterised in that
the sealing lip (25) is of a flexible nature such that contamination or swelling phenomena do not adversely impair the through-flow of the flow medium.

14. A flow control valve according to claim 1 characterised in that
the control member (4) has a chamber (23) whose volume is at least half as large as the volume variation in the pressure chamber (15), which is caused by a full stroke variation.

15. A flow control valve according to claim 1 characterised in that
the control member (4) is connected to a spindle (27) which is actuable manually or by a drive, that the spindle (27) is passed through a bore (28) in a mounting portion (29), and that the bore (28) is not round.

16. A flow control valve according to claim 1 characterised in that
a service gland (38) which seals off the pressure chamber (15) relative to the exterior can be inserted at the upper end of the spindle (27).

17. A flow control valve according to claim 1 characterised in that
the first valve seat (5) and the second valve seat (10) are formed by a valve insert (7) which is fixedly connected to the valve housing (6).

18. A flow control valve according to claim 1 characterised in that
the valve housing (6) is releasably connected to the pipe or housing forming the inlet chamber (1) and the outlet chamber (3).

19. A flow control valve for controlling the through-flow of a flow medium, comprising an inlet chamber (1), two successively arranged throttle locations and an outlet chamber (3), wherein the first throttle location serves as an adjusting member for the through-flow and wherein the pressure difference ($p_1$–$p_2$) across the first throttle location is controllable to a constant value by means of the second throttle location, and
the first throttle location is formed by a control member (4) which cooperates with a first valve seat (5),
the second throttle location is formed by a pressure regulating member (9) which co-operates with a second valve seat (10), and
the inlet chamber (1) is communicated with a pressure chamber (15) which at least partially acts on the pressure regulating member (9);
characterized in that
a first operative surface ($A_1$) which transmits the pressure ($p_1$) obtaining in the inlet chamber (1) to the pressure regulating member (9) is approximately equal to a second operative surface ($A_2$) which transmits the pressure ($p_2$) obtaining between the two throttle locations to the pressure regulating member (9), and
the pressure regulating member (9) permits a rotationally symmetrical through-flow of the flow medium,
wherein the control member (4) and the pressure regulating member (9) are connected by means of a resilient diaphragm (13) and are displaceable in an identical first direction (12).

20. A flow control valve for controlling the through-flow of a flow medium, comprising an inlet chamber (1), two successively arranged throttle locations and an outlet chamber (3), wherein the first throttle location serves as an adjusting member for the through-flow and wherein the pressure difference ($p_1$–$p_2$) across the first throttle location is controllable to a constant value by means of the second throttle location, and
the first throttle location is formed by a control member (4) which cooperates with a first valve seat (5),
the second throttle location is formed by a pressure regulating member (9) which co-operates with a second valve seat (10), and
the inlet chamber (1) is communicated with a pressure chamber (15) which at least partially acts on the pressure regulating member (9);
characterized in that a first operative surface ($A_1$) which transmits the pressure ($p_1$) obtaining in the inlet chamber (1) to the pressure regulating member (9) is approximately equal to a second operative surface ($A_2$) which transmits the pressure ($p_2$) obtaining between the two throttle locations to the pressure regulating member (9), and the pressure regulating member (9) permits a rotationally symmetrical through-flow of the flow medium, wherein the pressure regulating member (9) forms in the region around the second throttle location by means of vanes (17) arranged approximately parallel to the first direction (12) flow chambers which prevent a flow of the flow medium in directions which are not approximately parallel to the first direction (12).

21. A flow control valve for controlling the through-flow of a flow medium, comprising an inlet chamber (1), two successively arranged throttle locations and an outlet chamber (3), wherein the first throttle location serves as an adjusting member for the through-flow and wherein the pressure difference ($p_1$–$p_2$) across the first throttle location is controllable to a constant value by means of the second throttle location, and the first throttle location is formed by a control member (4) which cooperates with a first valve seat (5), the second throttle location is formed by a pressure regulating member (9) which co-operates with a second valve seat (10), and the inlet chamber (1) is communicated with a pressure chamber (15) which at least partially acts on the pressure regulating member (9);

characterized in that a first operative surface ($A_1$) which transmits the pressure ($p_1$) obtaining in the inlet chamber (1) to the pressure regulating member (9) is approximately equal to a second operative surface ($A_2$) which transmits the pressure ($p_2$) obtaining between the two throttle locations to the pressure regulating member (9), and the pressure regulating member (9) permits a rotationally symmetrical through-flow of the flow medium, wherein the control member (4) has a rubber portion (24) which with the first valve seat (5) forms the first throttle location, wherein the rubber portion (24) has a sealing lip (25) which sectorially delimits the flow of the flow medium through the first flow location.

22. A flow control valve according to claim 1 wherein the sealing lip (25) is of a flexible nature such that contamination or swelling phenomena do not adversely impair the through-flow of the flow medium.

23. A flow control valve for controlling the through-flow of a flow medium, comprising an inlet chamber (1), two successively arranged throttle locations and an outlet chamber (3), wherein the first throttle location serves as an adjusting member for the through-flow and wherein the pressure difference ($p_1$–$p_2$) across the first throttle location is controllable to a constant value by means of the second throttle location, and the first throttle location is formed by a control member (4) which cooperates with a first valve seat (5), the second throttle location is formed by a pressure regulating member (9) which cooperates with a second valve seat (10), and the inlet chamber (1) is communicated with a pressure chamber (15) which at least partially acts on the pressure regulating member (9);

characterized in that a first operative surface ($A_1$) which transmits the pressure ($p_1$) obtaining in the inlet chamber (1) to the pressure regulating member (9) is approximately equal to a second operative surface ($A_2$) which transmits the pressure ($p_2$) obtaining between the two throttle locations to the pressure regulating member (9), and the pressure regulating member (9) permits a rotationally symmnetrical through-flow of the flow medium, wherein the control member (4) is connected to a spindle (27) which is actuable manually or by a drive, wherein the spindle (27) is passed through a bore (28) in a mounting portion (29), and wherein the bore (28) is not round.

* * * * *